Figure 1:
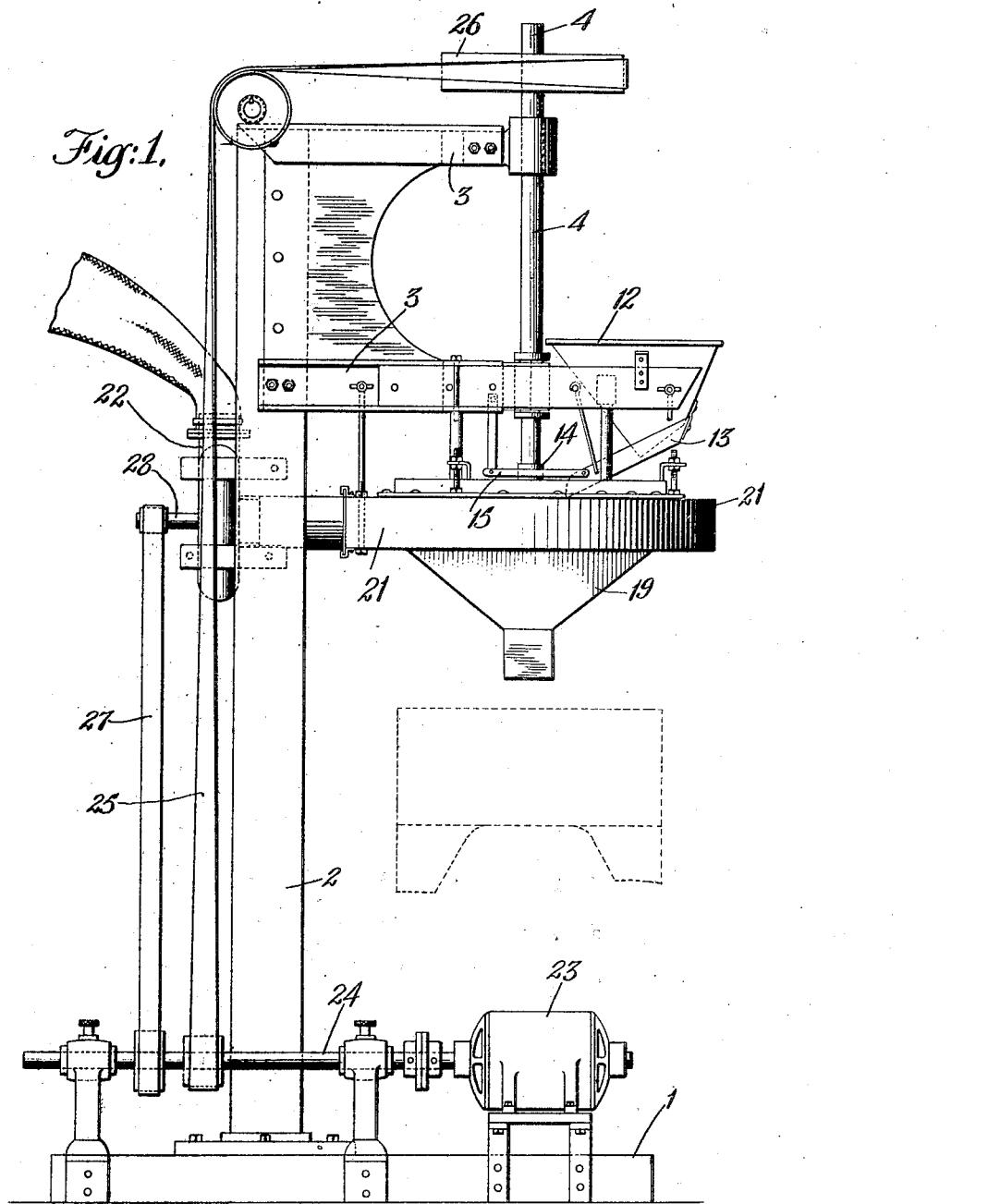

R. A. GREENE.
NUT BLANCHER.
APPLICATION FILED JULY 12, 1921.
1,434,816.
Patented Nov. 7, 1922.
2 SHEETS—SHEET 2.
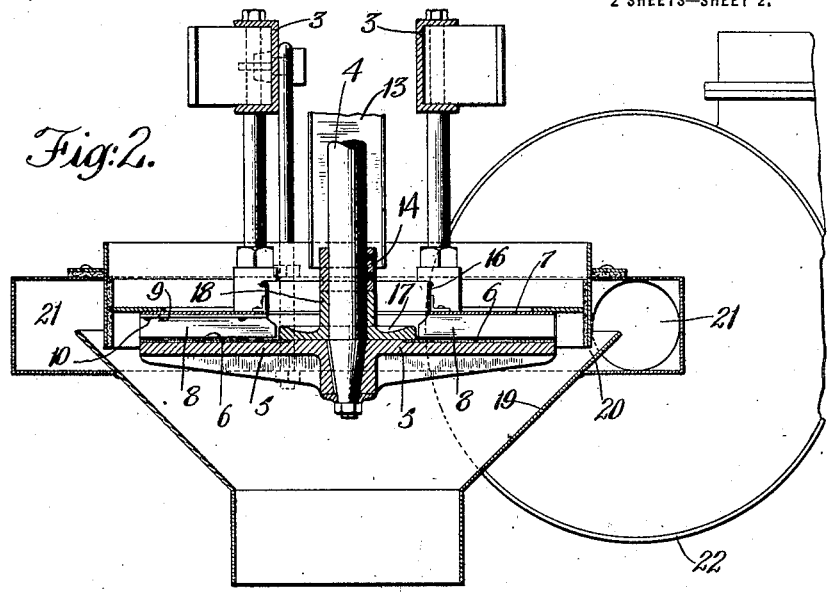
Fig. 2.
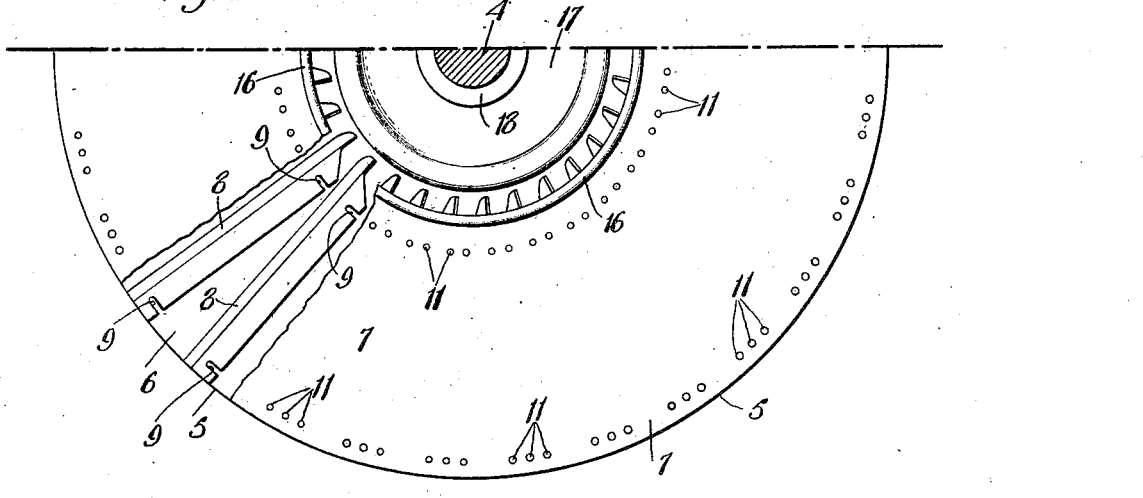
Fig. 3.
Fig. 4.
Inventor
Richard A. Greene,
By his Attorney Patented Nov. 7, 1922.

1,434,816

UNITED STATES PATENT OFFICE.

RICHARD A. GREENE, OF BROOKLYN, NEW YORK, ASSIGNOR TO JABEZ BURNS & SONS, A CORPORATION OF NEW YORK.

NUT BLANCHER.

Application filed July 12, 1921. Serial No. 484,220.

*To all whom it may concern:*

Be it known that I, RICHARD A. GREENE, a citizen of the United States, and resident of Brooklyn, in the county of Kings and State of New York, have invented certain new and useful Improvements in Nut Blanchers, of which the following is a specification.

This invention relates to nut blanchers, and has particular preference to novel method and apparatus whereby previously prepared nuts, such as peanuts, are blanched preliminary to being salted or otherwise used, and the object of the invention is to effect the blanching without damage to the nuts and as far as possible without separating them into halves.

Up to the present time numerous machines have been devised for doing this work, the principle of which generally is to roll or rub the nut between relatively moving surfaces, as by brushes, wheels and the like, the nuts having first been slightly roasted or otherwise treated to loosen the skin. In operation of such mechanical rubbing devices, it is found that even where the nuts are carefully graded for size and the machine correspondingly adjusted there is a large percentage of "flats" or halves, and also in many instances the skin is not completely removed. The efficiency of a machine is judged largely according to the percentage of whole nuts turned out, as whole nuts are especially desirable for salting while flats are not so desirable. The manufacturers of such machines have spent much effort and expense in endeavoring to reduce the percentage of flats, which have to be picked out by hand, and after much investigation and experience with the present types of machines I have concluded that the use of rubbing surfaces between which the nut is held is objectionable because of the tendency to increase the percentage of flats.

According to this invention the objection is overcome by what I term a free nut method and machine, wherein instead of rolling or rubbing the nuts between relatively moving surfaces I freely tumble them between fixed and moving surfaces in such manner as to continuously vary their direction and rotation to cause the skins to fall off and be drawn away from the nuts without producing an objectionable percentage of flats.

In the specific form of the invention herein illustrated by way of example, centrifugal force is employed to move the nuts, the nuts being fed at the center of a revolving roughened disk and freely move outward thereon between stationary guide vanes by centrifugal force while continually tumbling in different directions. Such a machine not only gives large capacity of output because of the ability to use the entire surface of the disk for removing the skins, but also does not put mechanical pressure on the nuts to cause them to separate. In the machine herein disclosed the skins drop off and are drawn away by an air blast while nuts are discharged by gravity from the periphery of the disk into a suitable hopper and thence to a belt or other device where the blanched nuts can be inspected and the relatively small percentage of flats removed. Although centrifugal force is sufficient for imparting the requisite velocity to the nuts, better results are secured because of better control by regulating the air velocity so that it in part functions in determining the actual velocity of the nuts moving radially of the disk in the channels formed by the stationary vanes.

As herein shown the machine comprises a horizontal rotatable plate faced with sand paper with a superposed stationary cover carrying adjustable more or less radial vanes, with a hopper at the center, and a casing surrounding the disk having a connection to an exhaust blower for carrying away the skins and a chute leading downwardly below the disk for receiving the nuts.

In the accompanying drawings,

Figure 1 is an elevation of a machine embodying the invention,

Figure 2 a section on an enlarged scale,

Figure 3 a plan view of the casing carrying the vanes, seen from below, and

Figure 4 is a detailed section of one of the vanes carried by the cover above the disk.

1 represents a base carrying a column 2 having at its upper end arms 3 in which is mounted a vertical shaft 4, carrying at its lower end the removable disk 5 having a roughened surface 6 preferably composed of rather coarse emery cloth which is cemented to the disk. A stone or emery wheel could be used instead, but it is found that after some use the surface takes up oil from the nuts and requires cleaning, as with a wire brush or a solvent of peanut oil, so it is more convenient to provide each machine with two disks one of which is a reserve, so that the emery cloth facing on the other can be renewed and allowed to set ready for use. The disk herein shown is preferably flat but it may be coned or curved if desired. Above the disk is a stationary cover 7, carrying vanes 8, the vanes being angularly adjustable so as to get the proper angle. This angle is determined partly by experiment, partly by the size and speed of the disk, partly by the coarseness of the surface, and partly by the character of the nuts, so that it is impossible to give the proper angle for varying conditions, but the angle shown herein is suitable for a disk rotating 400 revolutions per minute and using emery cloth facing, working on medium to large size nuts previously roasted just sufficiently to loosen the skins. The vanes are made of angle iron slightly bent as shown in Figure 4 with a slot 9 in each end fastened to the cover 7 by screws 10 passing through holes 11, thus giving wide range of angular adjustment. I have obtained the most satisfactory results with the vanes very slightly off radial, the outer end of the vane slopping in the direction of rotation of the disk. The angle of the vane to the disk is about as shown so that the nuts will not jam between the vane and the disk and be ground flat and also so that a flat will not jam but will feed outwardly.

12 represents the hopper for nuts having a shaking chute 13 operated from eccentric 14 on the shaft 4 through link 15. The chute 13 feeds the nuts through the central hopper 16 carried by casing 7 into the cup shaped depression 17 formed in collar 18 mounted on the shaft, and then the nuts are thrown radially outward between the vanes 8. In this passage outwardly between the vanes the nuts are freely tumbled over and over in all directions, impact appearing to have the effect of breaking the skin so that it mostly completely separates from the nut. The nuts are discharged outwardly of the disk into hopper 19, while the skins are drawn through the space 20 into a conduit 21 leading to blower 22, the skins being caught preferably in a cloth bag like that used on a vacuum cleaner.

The disk is driven from motor 23 through shaft 24 and belt 25 to pulley 26, while the blower is driven by belt 27 to shaft 28. The hopper 19 is detachably fastened to the casing 7, or to the frame of the machine so as to be lowered or swung out of the way when the disk is to be removed from the lower end of the shaft.

So far as I am aware a machine wherein the nuts are freely tumbled to remove the skins is new in this art, it being seen that the nuts are not under pressure during the blanching, being free to move and tumble in the radial channels provided by the vanes according to the velocity of the disk and the strength of the air blast, and in actual operation a much lower percentage of flats and higher percentage of complete removal of skins from whole nuts have been obtained than in previous machines with which I am familiar.

The machine is capable of various modifications and changes without departing from the scope of the appended claims. I am aware that it has heretofore been proposed to peel potatoes and similar vegetables by tumbling them in a rotatable container having a bottom of abrasive material, and that it has also been proposed to pass nuts under yielding pressure over an abrading surface. I regard a vegetable peeling machine as in a different art and involving different problems than that dealt with herein in blanching nuts, while the yielding pressure of nuts on an abrading surface is objectionable for the reason stated.

What I claim is:

1. In a nut blancher, an abrading disc having at the center a cup to receive nuts from a hopper for distributing and discharging nuts evenly over the disc, and a channel closed on one side by the disc and receiving the nuts from the cup.

2. In a nut blancher, an abrading disc having at the center a cup to receive nuts from a hopper for distributing and discharging nuts evenly over the disc, a channel closed on one side by the disc and receiving the nuts from the cup and means for forcing an air blast through the channel.

3. A nut blancher comprising in combination a hopper, a rotary cup shaped member beneath said hopper, a rotary abrading surface around said member, and means for moving the nuts over the abrading surface, and a receiving means to catch the nuts at the outer rim of said abrading surface.

4. In a nut blancher, the combination with a rotary cup shaped member, of a rotary disc around the periphery of the cup shaped member, and means for freely moving the nuts discharged by the cup shaped member, substantially radially across said disc.

5. In a nut blancher, the combination with a rotary abrading surface, of a stationary guide channel extending across said surface for directing the movement of nuts across the abrading surface, an upper supporting member to which the guide channel is bolted, said upper supporting member being provided with a plurality of bolt holes for adjusting the inclination of said channel.

6. A nut blancher comprising a cup shaped member for receiving the nuts, a rotary abrading disc around said member, and means including a guide channel for freely tumbling the nuts across said abrading disc.

Signed at New York, in the county of New York and State of New York, this 4th day of May, A. D. 1921.

RICHARD A. GREENE.